United States Patent
Wada

(10) Patent No.: US 10,139,700 B2
(45) Date of Patent: Nov. 27, 2018

(54) OPTICAL DEVICE

(71) Applicant: FUJIKURA LTD., Tokyo (JP)

(72) Inventor: Hideyuki Wada, Chiba (JP)

(73) Assignee: FUJIKURA LTD., Tokyo (JP)

( * ) Notice: Subject to any disclaimer, the term of this patent is extended or adjusted under 35 U.S.C. 154(b) by 8 days.

(21) Appl. No.: 15/541,924

(22) PCT Filed: May 10, 2016

(86) PCT No.: PCT/JP2016/063896
§ 371 (c)(1),
(2) Date: Jul. 6, 2017

(87) PCT Pub. No.: WO2017/022289
PCT Pub. Date: Feb. 9, 2017

(65) Prior Publication Data
US 2018/0275484 A1    Sep. 27, 2018

(30) Foreign Application Priority Data
Aug. 4, 2015  (JP) .................. 2015-154551

(51) Int. Cl.
*G02F 1/31* (2006.01)
*G02F 1/01* (2006.01)
(Continued)

(52) U.S. Cl.
CPC ............... *G02F 1/31* (2013.01); *G02F 1/01* (2013.01); *G02F 1/29* (2013.01); *G02B 1/10* (2013.01); *G02B 1/11* (2013.01)

(58) Field of Classification Search
CPC ... G02F 1/01; G02F 1/061; G02F 1/31; G02F 1/13; G02F 1/1333; G02F 1/133308;
(Continued)

(56) References Cited

U.S. PATENT DOCUMENTS 3,468,523 A * 9/1969 Sydney ............... H05K 5/0095
                                                228/44.7
3,710,074 A * 1/1973 Stewart ............ B32B 17/10055
                                                219/203
(Continued)

FOREIGN PATENT DOCUMENTS

EP          1429366 A1    6/2004
JP         S58-056482 A   4/1983
(Continued)

OTHER PUBLICATIONS

Extended European Search Report issued in corresponding European Patent Application No. 16832569.4 dated May 11, 2018 (7 pages).

(Continued)

*Primary Examiner* — Loha Ben
(74) *Attorney, Agent, or Firm* — Osha Liang LLP

(57) ABSTRACT

An optical device includes a housing part that includes an open window disposed inside the housing part, an optical element into which light enters via the window, and a window glass plate that blocks the window. The window glass plate includes a light-transmissive base material and a metal coating film provided on an outer peripheral part of the light-transmissive base material. The window glass plate is fixed to the housing part with a solder layer provided between the metal coating film and the housing part. The housing part includes an edge part located toward the window, and the edge part includes an overhanging part that protrudes further than an inner peripheral-side edge part of the metal coating film in a direction toward a center part of the window.

4 Claims, 9 Drawing Sheets

(51) Int. Cl.
*G02F 1/29* (2006.01)
*G02B 1/10* (2015.01)
*G02B 1/11* (2015.01)

(58) Field of Classification Search
CPC ... G02F 1/29; G02F 1/292; G02F 1/15; G02F 1/153; G02F 1/155; G02F 2001/133322; G02F 2001/133308; H01S 3/034; H01S 3/0621; H01S 3/0623; H01S 3/08; C03C 17/36; C03C 17/3607; C03C 17/3618; H05K 5/0095; H05K 5/06; E06B 3/00; E06B 3/08; G09G 5/00; G02B 1/10; G02B 1/11; B32B 15/00; B32B 17/10018; B32B 17/10045; B32B 17/10174
USPC ....... 359/320, 315, 265–275, 894, 896, 360, 359/245, 288, 558, 563, 566, 820; 372/98, 103; 345/105, 106; 228/44.7, 228/46; 428/34, 38, 432, 433
See application file for complete search history.

(56) References Cited

U.S. PATENT DOCUMENTS

| | | | | |
|---|---|---|---|---|
| 5,139,850 A | * | 8/1992 | Clarke | C03C 17/36 174/389 |
| 5,418,025 A | * | 5/1995 | Harmand | B32B 17/10036 219/203 |
| 7,728,260 B2 | * | 6/2010 | Johnson | F24D 13/026 219/200 |
| 2003/0030064 A1 | | 2/2003 | Takano et al. | |
| 2003/0207481 A1 | | 11/2003 | Takano et al. | |
| 2004/0165123 A1 | | 8/2004 | Iguchi et al. | |
| 2018/0045990 A1 | * | 2/2018 | Wada | G02F 1/1333 |

FOREIGN PATENT DOCUMENTS

| | | |
|---|---|---|
| JP | 2001-176993 A | 6/2001 |
| JP | 2003-050341 A | 2/2003 |
| JP | 2008-211025 A | 9/2008 |
| JP | 2009-291803 A | 12/2009 |
| JP | 2011-008105 A | 1/2011 |
| JP | 2011-141158 A | 7/2011 |
| JP | 2015-031903 A | 2/2015 |
| WO | 2012/165357 A1 | 12/2012 |

OTHER PUBLICATIONS

Japanese Office Action issued in corresponding application No. 2015-154551 dated Mar. 7, 2017 (2 pages).
Japanese Office Action issued in corresponding application No. 2015-154551 dated Aug. 9, 2016 (3 pages).

* cited by examiner

OPTICAL DEVICE

TECHNICAL FIELD

The present invention relates to an optical device which includes a housing and an optical element in the housing and which is configured so that a glass member is fixed to a window of the housing.

BACKGROUND

According to a conventional optical device including an optical element provided in a housing, a window that is an opening is provided in the housing, so that external light (optical signal) can enter, via the window, the optical element which is provided in the housing. This causes the window to be blocked by a glass member that allows light to pass therethrough.

An optical device disclosed in Patent Literature 1 includes, as an optical element, a wavelength variable interference filter provided in a housing. According to the optical device, (i) a lid is provided at an upper part of the housing and (ii) a glass member is combined with an upper part of the lid by a fixing member. In a center part of the lid, a window that is a circular opening is provided, and a glass member is provided so as to block the window. The fixing member between the lid and the glass member is made of, for example, a low-melting glass, and has a width equal to an overlapping width by which the lid and the glass member overlap each other. That is, the fixing member is configured so that (i) an inner peripheral-side edge part along the window matches an inner peripheral-side edge part of the lid and (ii) an outer peripheral-side edge part matches an outer peripheral-side edge part of the glass member.

An optical device (optical switch module) disclosed in Patent Literature 2 includes, as an optical element, a MEMS (Micro Electro Mechanical System) mirror array chip provided in a housing. According to the optical device, (i) a lid frame is provided at an upper part of a housing and (ii) a glass member (plate-like sapphire) is combined with an upper part of the lid frame by a fixing member. In a center part of the lid frame, a window that is a rectangular opening is provided, and a glass member is provided so as to block the rectangular opening. The fixing member between the lid frame and the glass member has a width narrower than an overlapping width by which the lid frame and the glass member overlap each other. The fixing member is configured so that an inner peripheral-side edge part along the opening matches an inner peripheral-side edge part of the lid frame.

[Patent Literature 1]
Japanese Patent Application Publication Tokukai No. 2015-31903 (Publication date: Feb. 16, 2015)
[Patent Literature 2]
Japanese Patent Application Publication Tokukai No. 2011-8105 (Publication date: Jan. 13, 2011)

FIG. 10 is a perspective view illustrating main components of a conventional optical device 101 including an optical element in a housing and being configured so that (i) a window 111a that is an opening is provided in a frame 111 constituting the housing and (ii) the window 111a is blocked by a window glass plate 112. (a) of FIG. 11 is a cross-sectional view taken along the line D-D in FIG. 10. (b) of FIG. 11 is a cross-sectional view illustrating cracking of a glass member illustrated in (a) of FIG. 11. (c) of FIG. 11 is a plan view illustrating the parts illustrated in (b) of FIG. 11.

Note that the window glass plate 112 is provided in the frame 111 so as to block the window 111a from below.

According to the configuration in which the window 111a of the frame 111 is blocked by the window glass plate 112, a solder (Au—Sn) is widely used as a fixing member for fixing the window glass plate 112 to the window 111a of the frame 111 which is made of metal. Specifically, as illustrated in (a) of FIG. 11, (i) a metal coating film 114 is annularly formed in a region which is located in a periphery of the window glass plate 112 and in which a solder layer (fixing member) 113 is provided and (ii) a solder layer 113 is provided on the metal coating film 114. Therefore, the window glass plate 112 is fixed to the frame 111 by the solder layer 113 between the metal coating film 114 and the frame 111. That is, the window glass plate 112 is fixed to the frame 111 by the solder layer 113 being bonded to the metal coating film 114 and to the frame 111 by metallic bond.

In this case, in a case where the solder layer 113 is melted, the solder layer 113 is wetly spread all over a top surface of the metal coating film 114. Therefore, in a case where an inner peripheral-side edge part 114a of the metal coating film 114 protrudes toward a center part of the window 111a further than a window-side edge part 111b of the frame 111, cracking 112a of the window glass plate 112 occurs (see (b) of FIG. 11) when a solder of the solder layer 113 having been melted is cooled and therefore hardened. This is because of a difference in thermal expansion coefficient between the solder of the solder layer 113 and the window glass plate 112. In other cases, after the melted solder of the solder layer 113 is cooled and therefore hardened, the difference in thermal expansion coefficient between the solder of the solder layer 113 and the window glass plate 112 results in strain of the window glass plate 112. This causes the occurrence of the cracking 112a of the window glass plate 112. In this case, the optical device 101 becomes less hermetic and durable.

Specifically, in a case where the solder layer 113 is cooled and therefore hardened, the solder layer 113 shrinks. The shrinkage of the solder layer 113 becomes notable in a region where no part of the frame 111 is located on the solder layer 113. This is because the shrinkage of the solder is not reduced by the frame 111 in the region. Therefore, in the region where no part of the frame 111 is located on the solder layer 113, the shrinkage of the solder layer 113 causes tensile stress, which is generated in a direction toward an outer peripheral-side end part of the metal coating film 114, to be applied to the metal coating film 114, that is, to the window glass plate 112 on which the metal coating film 114 is provided. This causes the occurrence of the cracking 112a of the window glass plate 112.

In addition, an inner peripheral-side edge part 113a of the solder layer 113 tends to protrude, toward the center part of the window 111a, further than the inner peripheral-side edge part 114a of the metal coating film 114. This causes an opening area of the window 111a to be small.

Note that according to the configurations of Patent Literatures 1 and 2, the glass member is fixed to the frame by the fixing member provided between (i) the frame (lid or lid frame) constituting the housing and (ii) the glass member. Furthermore, the inner peripheral-side edge part (corresponding to the inner peripheral-side edge part 114a) of the fixing member matches the window-side edge part (corresponding to the window-side edge part 111b) of the frame. According to this configuration, a tolerance during production of the optical device causes the inner peripheral-side edge part of the fixing member to easily protrude, in a direction toward the center part of the window, further than the inner peripheral-side edge part of the frame, which inner peripheral-side edge part is located along the window. Specifically, according to the configurations of Patent Literatures 1 and 2, in a case where a solder and a metal coating film are used as a fixing member, the inner peripheral-side edge part of the metal coating film protrudes, to the center part of the window, further than the window-side edge part of the frame as with the configuration illustrated in (a) and (b) of FIG. 11. This likewise causes the occurrence of cracking of the window glass plate.

SUMMARY

Under the circumstances, one or more embodiments of the present invention provide an optical device that makes it possible to prevent the occurrence of cracking of a glass member which cracking occurs due to a difference between (i) a thermal expansion coefficient of the glass member blocking a window of a frame and (ii) a thermal expansion coefficient of a solder by which the glass member is fixed to the frame.

An optical device according to one or more embodiments of the present invention includes: a housing part having a window that is opened; an optical element which is provided inside the housing part and into which light enters via the window; and a window glass plate provided so as to block the window, the window glass plate including (i) a light-transmissive base material and (ii) a metal coating film provided on an outer peripheral part of the light-transmissive base material so as to have a certain width, the window glass plate being fixed to the housing part with use of a solder layer which is provided between the metal coating film and the housing part, and an edge part of the housing part, which edge part is located toward the window, having an overhanging part that is protruding in a direction toward a center part of the window further than an inner peripheral-side edge part of the metal coating film.

According to one or more embodiments of the invention, it is possible to prevent the occurrence of cracking of a window glass plate which cracking occurs due to a difference between (i) a thermal expansion coefficient of a window glass plate blocking a window of a housing part and (ii) a thermal expansion coefficient of a solder by which the window glass plate is fixed to the housing part.

Figure 4:
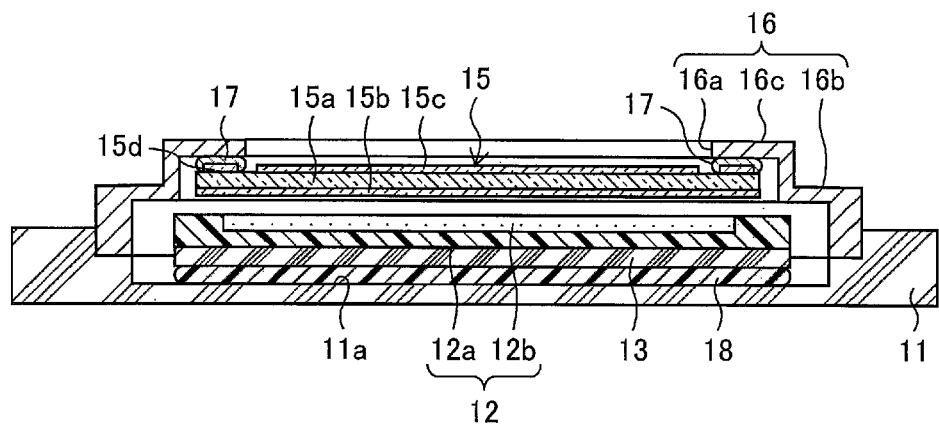
FIG. 4 is a cross-sectional view taken along the line A-A shown in FIG. 3.
Figure 5A:
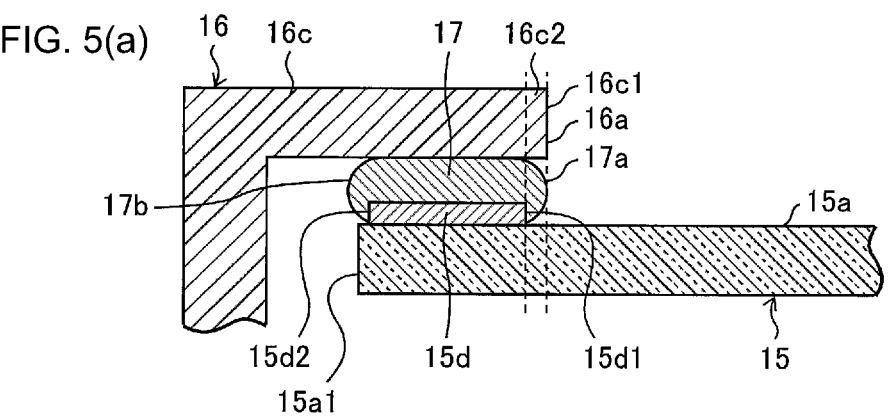
Figure 5B:
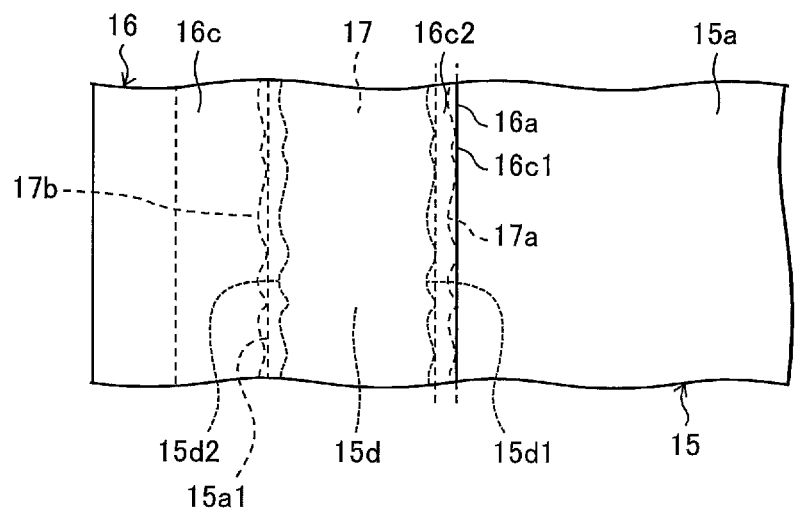

(a) of FIG. 5 is a longitudinal sectional view showing an example of a relationship between respective positions of (i) a protruding part of a lid part, (ii) a metal coating film of a window glass plate, and (iii) a solder layer, all of which are illustrated in FIG. 4. (b) of FIG. 5 is a plan view illustrating the members illustrated in (a) of FIG. 5.

Figure 6A:
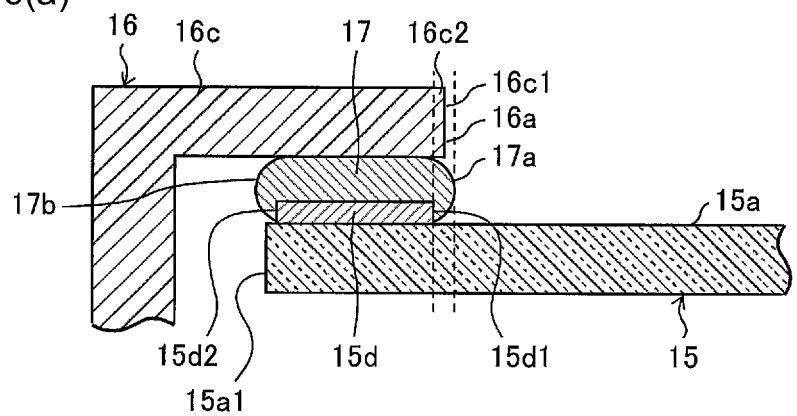
Figure 6B:
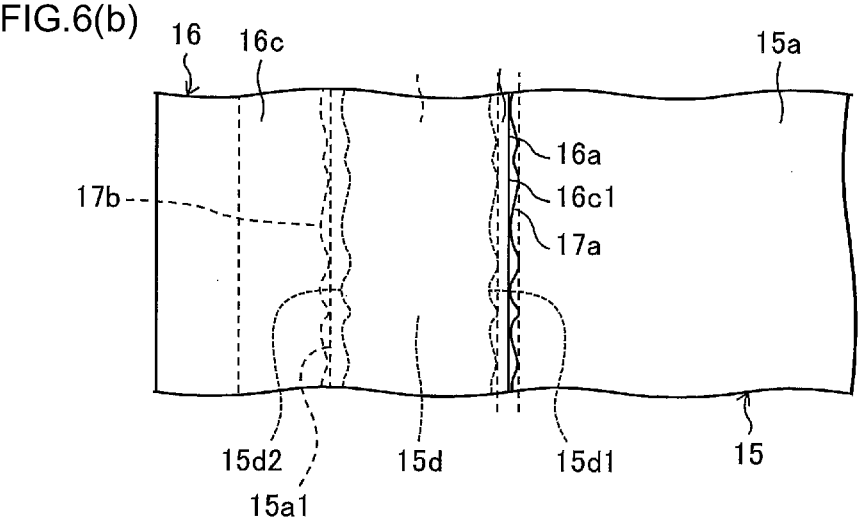
Figure 7A:
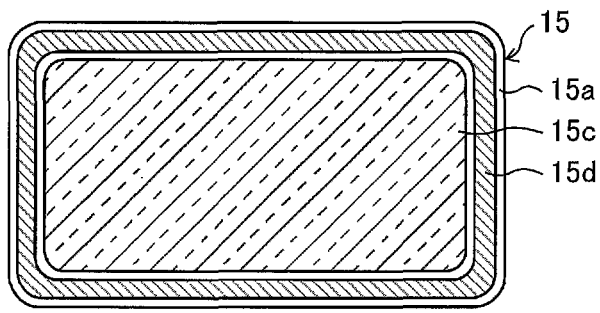
Figure 7B:
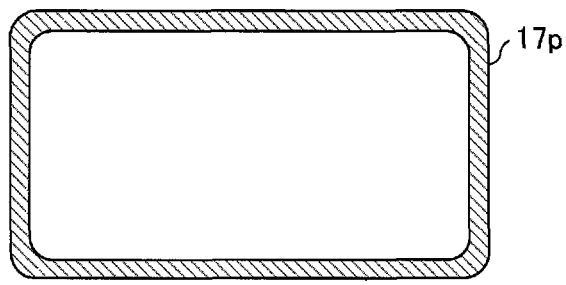
Figure 7C:
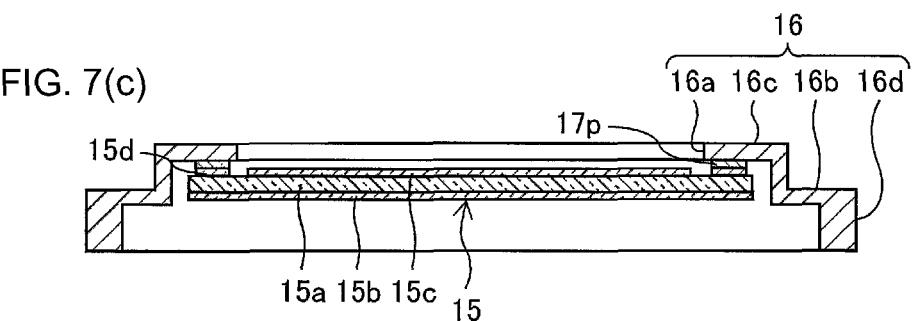
Figure 7D:
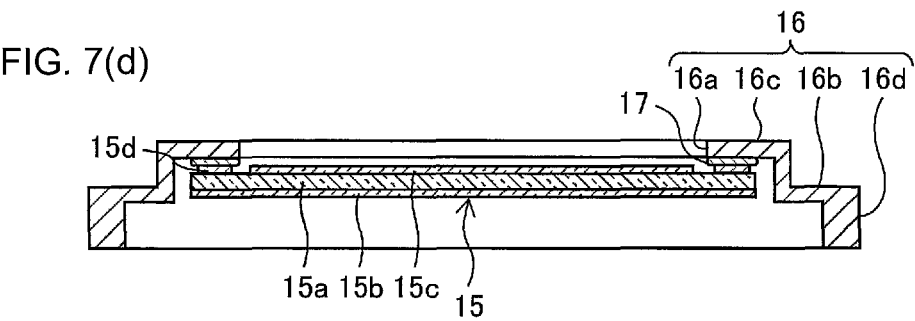

(a) of FIG. 6 is a longitudinal sectional view showing another example of a relationship between respective positions of (i) the protruding part of the lid part, (ii) the metal coating film of the window glass plate, and (iii) the solder layer, all of which are illustrated in FIG. 4. (b) of FIG. 6 is a plan view illustrating members illustrated in (a) of FIG. 6.

(a) of FIG. 7 is a plan view illustrating the window glass plate illustrated in FIG. 4. (b) of FIG. 7 is a plan view illustrating a solder frame for use in forming of the solder layer illustrated in FIG. 4. (c) of FIG. 7 is a longitudinal sectional view illustrating how the solder frame is provided between the lid part and the window glass plate illustrated in FIG. 4. (d) of FIG. 7 is a longitudinal sectional view illustrating how the lid part and the window glass plate are combined by the solder layer formed with the use of the solder frame illustrated in (c) of FIG. 7.

Figure 1:
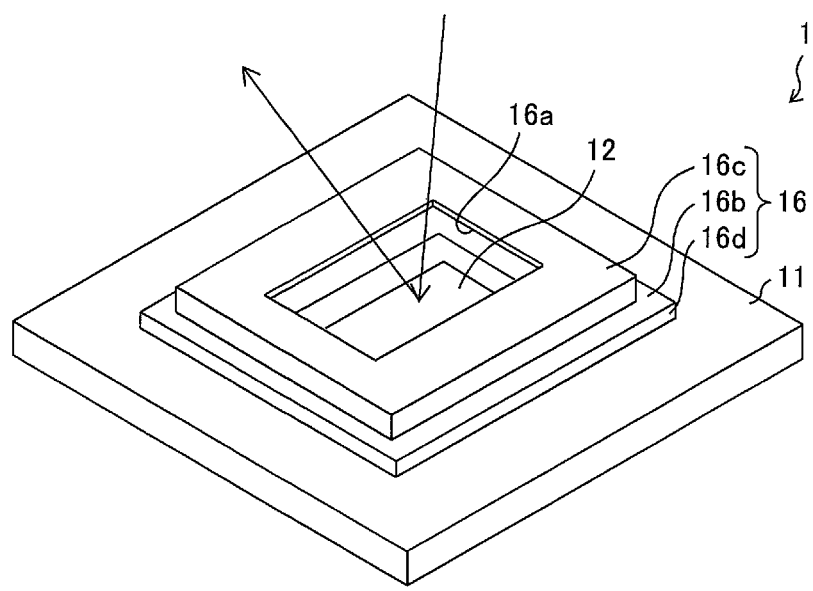
FIG. 1 is a perspective view illustrating an optical device in accordance with one or more embodiments of the present invention.
Figure 8A:
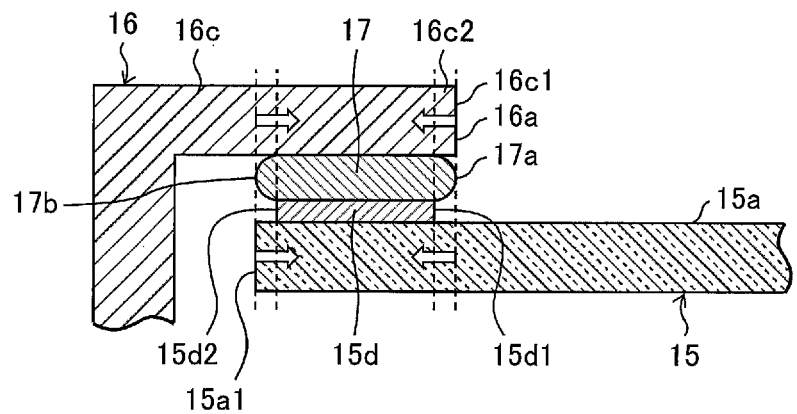
Figure 8B:
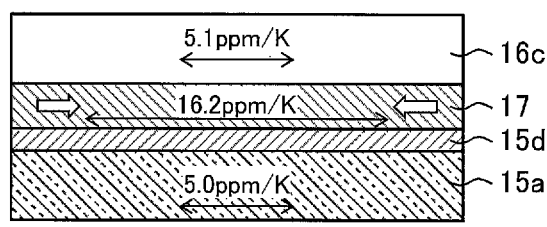

(a) of FIG. 8 is a view for describing how a tensile load is being applied to the light-transmissive base material of the window glass plate in the step of fixing the window glass plate to the lid part by the solder layer in the production of the optical device illustrated in FIG. 1. (b) of FIG. 8 is a view for describing examples of respective thermal expansion coefficients of the members illustrated in (a) of FIG. 8.

Figure 9:
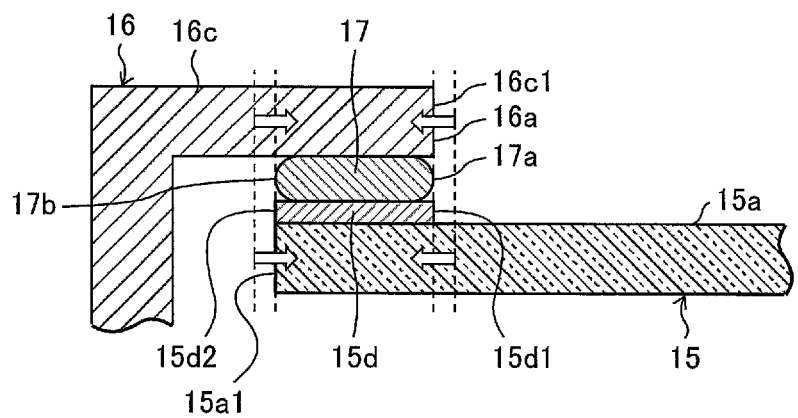

FIG. 9 is a view for describing a comparative example in comparison with the configuration illustrated in (a) of FIG. 8, and describing how a tensile load is being applied to the light-transmissive base material of the window glass plate in a case where there is a match, with respect to a width of the metal coating film, between a position of a window-side edge part of the lid part and a position of an inner peripheral-side edge part of the metal coating film.

Figure 10:
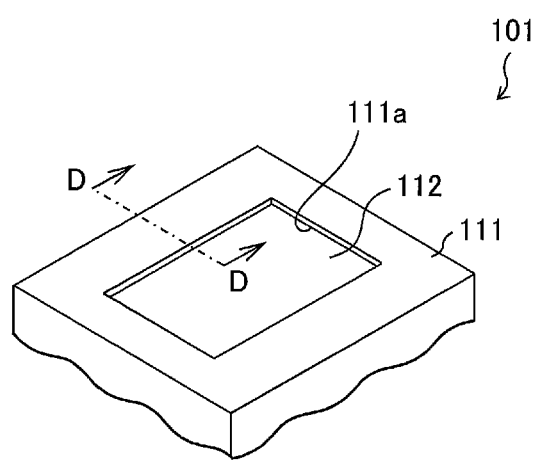

FIG. 10 is a perspective view illustrating main components of a conventional optical device including an optical element in a housing and being configured so that (i) a window that is an opening is provided in a frame constituting the housing and (ii) the window is blocked by a window glass plate.

Figure 11A:
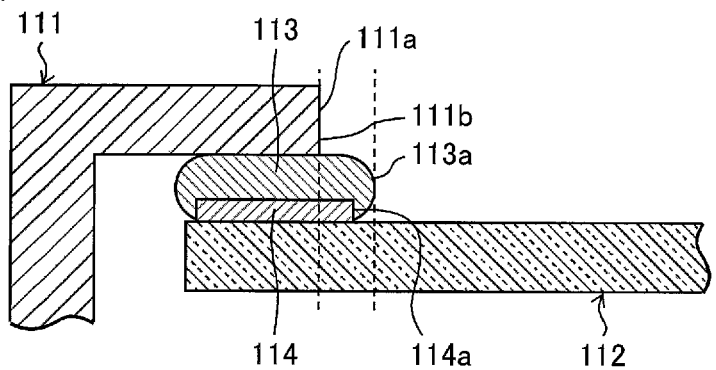
Figure 11B:
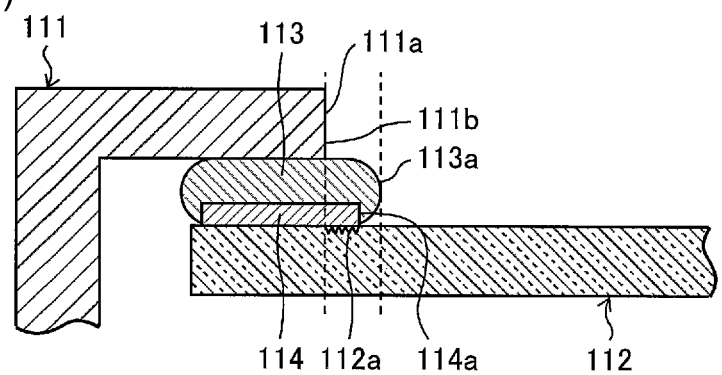
Figure 11C:
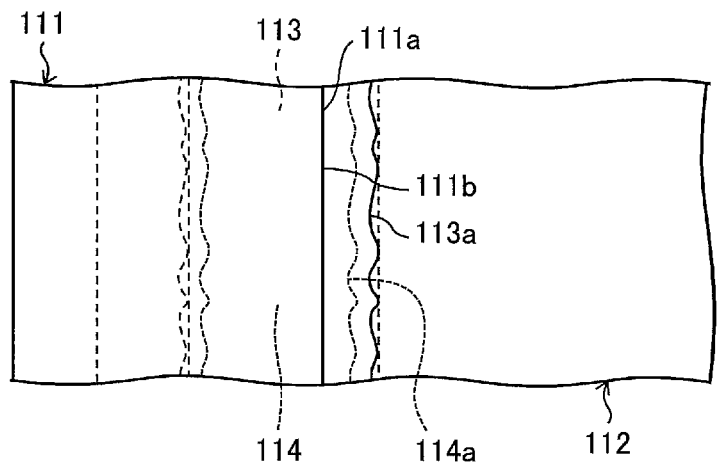

(a) of FIG. 11 is a cross-sectional view taken along the line D-D in FIG. 10. (b) of FIG. 11 is a cross-sectional view illustrating cracking of a glass member illustrated in (a) of FIG. 11. (c) of FIG. 11 is a plan view illustrating the parts illustrated in (b) of FIG. 11.

DETAILED DESCRIPTION OF EMBODIMENTS

The following description will discuss embodiments of the present invention with reference to the drawings. FIG. 1 is a perspective view illustrating an optical device 1 in accordance with one or more embodiments of the present invention. The optical device 1 in accordance with one or more embodiments is a hermetic LCOS package including an optical element 12. One or more embodiments of the optical element 12 encompass a LCOS (Liquid Crystal On Silicon).

(Appearance and Function of Optical Device 1)

As illustrated in FIG. 1, in one or more embodiments the optical device 1 further includes (i) a ceramic substrate 11 on which the optical element 12 is provided and (ii) a lid part (housing part, metal frame) 16 for sealing the optical element 12, and is configured so that light, which has entered from a window 16a of the lid part 16, is reflected by the optical element 12. In this case, (i) the optical element 12 includes a liquid crystal layer which forms a diffraction grating and (ii) a change in voltage to be applied to the optical element 12 causes the diffraction grating to change, so that a reflection angle of the light is changed. Specifically, in a case where light (optical signal), which has been emitted from an optical fiber and then has been subjected to wavelength-division multiplexing, is collimated and enters the optical element 12, the optical element 12 controls the light so that (i) parts of the light are reflected with respective reflection angles controlled according to respective wavelengths of the parts and (ii) the parts of the light enter respective optical fibers corresponding to respective wavelength channels of the parts.

(Configuration of Optical Device 1)

Figure 2:
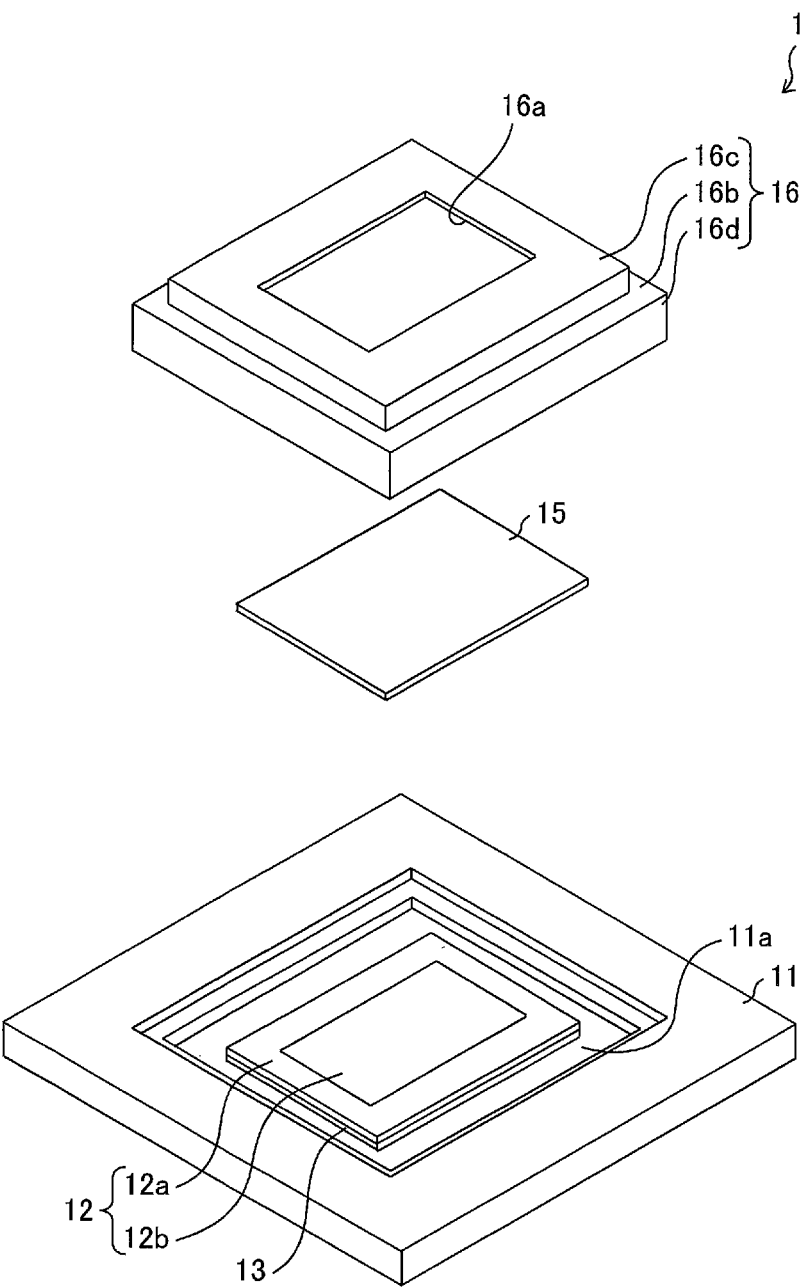
FIG. 2 is an exploded perspective view illustrating individual parts of the optical device illustrated in FIG. 1.
Figure 3:
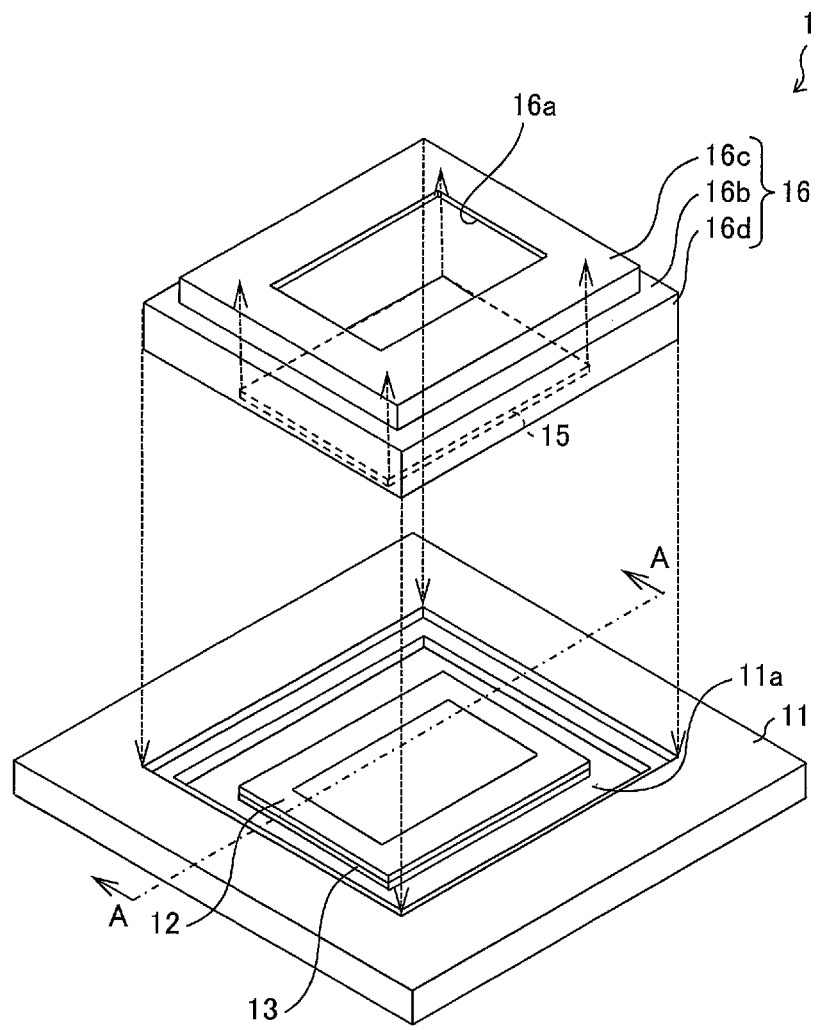
FIG. 3 is an exploded perspective view illustrating how the respective parts of the optical device 1 in FIG. 1 are related to each other in terms of their respective positions.

FIG. 2 is an exploded perspective view illustrating individual parts of the optical device 1 illustrated in FIG. 1. FIG. 3 is an exploded perspective view illustrating how the respective parts of the optical device 1 in FIG. 1 are related to each other in terms of their respective positions. FIG. 4 is a cross-sectional view taken along the line A-A shown in FIG. 3.

As illustrated in FIGS. 2 through 4, one or more embodiments of the optical device 1 includes the ceramic substrate 11, the optical element 12, a heater 13, a window glass plate (sealing glass) 15, and the lid part (housing part) 16.

The ceramic substrate 11 is made of, for example, alumina ceramic, and has, on a top surface thereof, a recess 11a in which the optical element 12 is to be provided.

The optical element 12 includes a silicon substrate 12a and a liquid crystal layer 12b. In the liquid crystal layer 12b, the diffraction grating is formed. In a case where a voltage applied to the optical element 12 changes, the diffraction grating changes so as to change a reflection angle of incident light. The heater 13 is obtained by including a heating circuit (not shown) and a temperature control circuit (not shown) in an alumina ceramic material. The heater 13 is provided on a bottom surface of the optical element 12. The optical element 12 and the heater 13 are connected to one or more connecting terminals (not shown) by, for example, wire bonding. The connecting terminal is connected to electronic components (not shown), such as a capacitor and a connector, which are provided on an outer surface of the optical device 1.

The optical element 12 is fixed by a resin layer 18 to a recess 11a of the ceramic substrate 11. The resin layer 18 is made of, for example, a low-outgassing two-part epoxy resin.

The lid part 16 has an outer peripheral part 16b, a protruding part 16c, and a sealing frame part 16d, and is provided on the ceramic substrate 11. The protruding part 16c is provided so as to protrude upwards by one step from an inter part of the outer peripheral part 16b. In the protruding part 16c, the window 16a is provided. At a bottom part of the outer peripheral part 16b, the sealing frame part 16d is provided so as to have a quadrilateral frame shape. The sealing frame part 16d is located on the ceramic substrate 11 so as to surround the recess 11a of the ceramic substrate 11.

The lid part 16 is made of, for example, Kovar (Registered Trademark) which is an alloy obtained by mixing nickel and cobalt with iron. Kovar (Registered Trademark) has a thermal expansion coefficient which is low among those of metals around normal temperature, and the thermal expansion coefficient is similar to that of hard glass.

The window glass plate 15 includes a light-transmissive base material 15a made of, for example, Kovar (Registered Trademark) glass. The light-transmissive base material 15a needs to be selected in view of polarization dependency of the optical element 12. Specifically, if there exists a crystallographic axis as is the case of a single crystal member, in the light-transmissive base material 15a, then an effect of a polarizer is produced. This makes it necessary that a polarization direction of a signal and a crystallographic axis match as much as possible. Therefore, the light-transmissive base material 15a may be an amorphous (glass) member.

On a bottom surface of the light-transmissive base material 15a, an anti-reflection film 15b is provided. On a top surface of the light-transmissive base material 15a, an anti-reflection film 15c and a metal coating film 15d are provided. The anti-reflection film 15b is provided all over the bottom surface of the light-transmissive base material 15a. The anti-reflection film 15c is provided on the entire part of the top surface of the window glass plate 15 except an outer peripheral part. A gap between the metal coating film 15d and the anti-reflection film 15c is for example, 0 mm to 2 mm.

The metal coating film 15d is annularly formed on the outer peripheral part of the window glass plate 15. The metal coating film 15d has, for example, (i) a three-layer structure in which a chrome layer, a nickel layer, and a gold layer (Cr layer/Ni layer/Au layer) are stacked in this order from the light-transmissive base material 15a-side or (ii) a two-layer structure in which a chrome layer and a gold layer (Cr layer/Au layer) are stacked in this order from the light-transmissive base material 15a-side. A width of the metal coating film 15d affects a strength with which the window glass plate 15 and the lid part 16 are boned together. The width of the metal coating film 15d is, for example, 0.4 mm to 1.0 mm. Since the metal coating film 15d is annularly formed, the solder layer 17, which is wetly spread on the metal coating film 15d, is also annular.

The solder layer 17 is annularly formed between (i) the top surface of the metal coating film 15d of the window glass plate 15 and (ii) a part of the bottom surface of the protruding part 16c of the lid part 16, which part surrounds the window 16a. The lid part 16 and the window glass plate 15 are combined together by the solder layer 17. The solder layer 17 is made of, for example, an alloy of gold and tin (Au—Sn).

In one or more embodiments, the optical device 1 is thus configured so that an inner space of the optical device 1, which inner space is surrounded by the ceramic substrate 11, the lid part 16, the solder layer 17, and the window glass plate 15, is hermetically sealed, that is, isolated from a space outside the optical device 1. This causes the optical element 12, which is present in the inner space of the optical device 1, to be hermetically sealed. The inner space of the optical device 1 is also filled with at least one of helium gas and nitrogen gas while the gas has a pressure higher than an external pressure.

(a) of FIG. 5 is a longitudinal sectional view showing an example of a relationship between respective positions of (i) the protruding part 16c of the lid part 16, (ii) the metal coating film 15d of the window glass plate 15, and (iii) the solder layer 17, all of which are illustrated in FIG. 4. (b) of FIG. 5 is a plan view illustrating the members illustrated in (a) of FIG. 5. (a) of FIG. 6 is a longitudinal sectional view showing another example of a relationship between respective positions of (i) the protruding part 16c of the lid part 16, (ii) the metal coating film 15d of the window glass plate 15, and (iii) the solder layer 17, all of which are illustrated in FIG. 4. (b) of FIG. 6 is a plan view illustrating members illustrated in (a) of FIG. 6.

As illustrated in (a) and (b) of FIG. 5, in one or more embodiments, an inner peripheral-side edge part 15d1 of the annular metal coating film 15d retreats, with respect to a window-side edge part 16c1 of the protruding part 16c of the lid part 16, in a direction opposite a direction toward a center part of the window 16a of the lid part 16. Therefore, the lid part 16 has an overhanging part 16c2 which is a part protruding in the direction toward the center part of the window 16a of the lid part 16 further than the inner peripheral-side edge part 15d1 of the metal coating film 15d.

As illustrated in (a) and (b) of FIG. 5, in one or more embodiments, an outer peripheral-side edge part 15d2 of the annular metal coating film 15d retreats, with respect to an outer peripheral-side edge part 15a1 of the light-transmissive base material 15a of the window glass plate 15, in the direction toward the center part of the window 16a of the lid part 16. Note that the outer peripheral-side edge part 15d2 of the metal coating film 15d and the outer peripheral-side edge part 15a1 of the light-transmissive base material 15a can be at the same position (single surface).

As shown in (a) and (b) of FIG. 5, a position of the inner peripheral-side edge part 17a of the solder layer 17 and a position of the window-side edge part 16c1 of the protruding part 16c of the lid part 16 are substantially the same. Meanwhile, the outer peripheral-side edge part 17b of the solder layer 17 protrudes, further than the outer peripheral-side edge part 15a1 of the light-transmissive base material 15a, in the direction opposite the direction toward the center part of the window 16a.

The relationship between the respective position of the protruding part 16c of the lid part 16, the metal coating film 15d of the window glass plate 15, and the solder layer 17 in the example shown in (a) and (b) of FIG. 6 is identical to that shown in the example shown in (a) and (b) of FIG. 5. Note, however, that in the example shown in (a) and (b) of FIG. 6, the inner peripheral-side edge part 17a of the solder layer 17 protrudes, with respect to the window-side edge part 16c1 of the protruding part 16c of the lid part 16, in the direction toward the center part of the window 16a of the lid part 16.

(Optical Device 1 Production Method)

A method of producing the optical device 1 configured as described above will be described below. (a) of FIG. 7 is a plan view illustrating the window glass plate 15 illustrated in FIG. 4. (b) of FIG. 7 is a plan view illustrating a solder frame 17p for use in forming of the solder layer 17 illustrated in FIG. 4. (c) of FIG. 7 is a longitudinal sectional view illustrating how the solder frame 17p is provided between the lid part 16 and the window glass plate 15. (d) of FIG. 7 is a longitudinal sectional view illustrating how the lid part 16 and the window glass plate 15 are combined by the solder layer 17 formed with the use of the solder frame 17p.

In production of the optical device 1, the following are prepared: (i) the lid part 16, (ii) the window glass plate 15 (see (a) of FIG. 7), (iii) the solder frame 17p for combining the lid part 16 and the window glass plate 15 together (see (b) of FIG. 7), (iv) the ceramic substrate 11, (v) the optical element 12, and (vi) the heater 13. The heater 13 is to be attached in advance to the bottom surface of the optical element 12 with the use of an adhesive.

As illustrated in (b) of FIG. 7, the solder frame 17p has a quadrilateral frame shape. Dimensions of the solder frame 17p correspond to dimensions of the metal coating film 15d of the window glass plate 15, and are substantially identical to the dimensions of the metal coating film 15d. The solder frame 17p is obtained by, for example, cutting out a piece from a plate-like solder by punching.

In the process of producing the optical device 1, first, the lid part 16 and the window glass plate 15 are combined. In this step, as illustrated in (c) of FIG. 7, the solder frame 17p is provided on the metal coating film 15d of the window glass plate 15, and then the lid part 16 is provided on the solder frame 17p.

Then, while the members are provided as illustrated in (c) of FIG. 7, the lid part 16, the window glass plate 15, and the solder frame 17p are heated to a melting temperature of the solder frame 17p. This step is carried out by, for example, reflow-soldering. In this case, the heating is carried out in an air atmosphere or in a nitrogen atmosphere at normal pressure.

Then, in a case where melting of the solder frame 17p proceeds, the metal coating film 15d of the window glass plate 15 and a bottom surface of the lid part 16 become wet because of a solder of the solder frame 17p. Then, as illustrated in (d) of FIG. 7, the window glass plate 15 and the lid part 16 are combined by the solder layer 17.

Then, the optical element 12 and the heater 13, which have been integrally combined, are fixed to the recess 1 1a of the ceramic substrate 11 by the resin layer 18.

Lastly, the lid part 16, with which the window glass plate 15 is combined, is brazed to the ceramic substrate 11 at normal pressure and in at least one of a helium atmosphere or a nitrogen atmosphere.

(Advantage of Optical Device 1)

(a) of FIG. 8 is a view for describing how a tensile load is being applied to the light-transmissive base material 15a of the window glass plate 15 in the step of fixing the window glass plate 15 to the lid part 16 by the solder layer 17 in the production of the optical device 1. (b) of FIG. 8 is a view for describing examples of respective thermal expansion coefficients of the members illustrated in (a) of FIG. 8. FIG. 9 is a view for describing a comparative example in comparison with the configuration illustrated in (a) of FIG. 8, and describing how a tensile load is being applied to the light-transmissive base material 15a of the window glass plate 15 in a case where there is a match, with respect to a width of the metal coating film 15d, between a position of the window-side edge part 16c1 of the lid part 16 and a position of the inner peripheral-side edge part 15d1 of the metal coating film 15d.

In a case where the window glass plate 15 is fixed to the lid part 16 by melting the solder frame 17p to become the solder layer 17 between the lid part 16 and the metal coating film 15d of the window glass plate 15, the solder of the solder frame 17p, which has been melted, is cooled so as to shrink. In this case, the thermal expansion coefficient of the solder is greater than the thermal expansion coefficient of the light-transmissive base material 15a of the window glass plate 15. A difference between the thermal expansion coefficient of the solder and the thermal expansion coefficient of the light-transmissive base material 15a causes a tensile load (tensile stress), which is indicated by arrows in (a) of FIG. 8, to be applied to the light-transmissive base material 15a.

Note that the solder, which has been melted, adheres also to the overhanging part 16c2 of the lid part 16. The overhanging part 16c2 consequently restricts the shrinkage of the solder in a direction, toward a center part, along a width of the solder layer 17 (i.e. the width of the metal coating film 15d), so that the tensile load applied to the light-transmissive base material 15a becomes reduced. This prevents the occurrence of cracking of the light-transmissive base material 15a.

Meanwhile, in a case where there is a match, with respect to the width of the metal coating film 15d, between the position of the window-side edge part 16c1 of the lid part 16 and the position of the inner peripheral-side edge part 15d1 of the metal coating film 15d, the shrinkage of the solder in the direction, toward the center part, along the width of the solder layer 17 is less restricted because the lid part 16 does not have an overhanging part 16c2. This means that in the configuration illustrated in FIG. 9, the occurrence of cracking of the light-transmissive base material 15a is prevented less effectively in comparison with the configuration illustrated in (a) of FIG. 8.

According to the optical device 1, the lid part 16 has the overhanging part 16c2. This causes a window 16a-side end part of the solder layer 17, which is formed by a solder wetly spread on the metal coating film 15d of the window glass plate 15, to be unlikely to protrude into the window 16a (i.e. unlikely to jut out), and therefore prevents the solder layer 17 from causing a reduction in an opening area of the window 16a. In other words, an increase in size of the lid part 16, that is, the optical device 1 for increasing the opening area of the window 16a can be prevented.

According to the optical device 1, the lid part 16 is made of Kovar (Registered Trademark), and the light-transmissive base material 15a is made of Kovar (Registered Trademark) glass. This causes the respective thermal expansion coefficients of the lid part and the light-transmissive base material 15a to be substantially equal, and causes the thermal expansion coefficient of the lid part 16 to be less than the thermal expansion coefficient of the solder layer 17. Therefore, the lid part 16 can be prevented from shrinking along with the shrinkage of the solder when the solder of the solder layer 17 is cooled, and consequently the occurrence of cracking of the light-transmissive base material 15a can be reliably prevented by the lid part 16 having the overhanging part 16c2.

Note that in regard to a relationship between the respective thermal expansion coefficients of the lid part 16, the light-transmissive base material 15a of the window glass plate 15, and the solder layer 17, the thermal expansion coefficient of the lid part 16 and the thermal expansion coefficient of the light-transmissive base material 15a may be equal and the thermal expansion coefficient of the lid part 16 may be less than the thermal expansion coefficient of the solder layer 17.

The thermal expansion coefficients of the members illustrated in (a) of FIG. 8 are as follows (see (b) of FIG. 8): (i) lid part 16 (Kovar (Registered Trademark)): 5.1 ppm/K, (ii) the light-transmissive base material 15a (Kovar (Registered Trademark) glass): 5.0 ppm/K, and (iii) the solder layer 17 (Au—Sn solder): 16.2 ppm/K.

Note that a combination of a material for the lid part 16 and a material for the light-transmissive base material 15a may be a combination of Kovar (Registered Trademark) for the lid part 16 and Kovar (Registered Trademark) glass for the light-transmissive base material 15a. Examples of alternative combination encompass: (i) a combination of platinum (8.8 ppm/K) and lead glass (8.4 ppm/K to 9.1 ppm/K) for the lid part 16 and the light-transmissive base material 15a, respectively, (ii) a combination of tungsten (4.5 ppm/K) and borosilicate glass (4.3 ppm/K to 4.6 ppm/K) or alumina-silica glass (4.2 ppm/K to 4.6 ppm/K) for the lid part 16 and the light-transmissive base material 15a, respectively, and (iii) a combination of carbon steel (10.8 ppm/K) and lead glass (10.4 ppm/K) for the lid part 16 and the light-transmissive base material 15a, respectively.

[Summary]

An optical device in accordance with one or more embodiments includes: a housing part having a window that is opened; an optical element which is provided inside the housing part and into which light enters via the window; and a window glass plate provided so as to block the window, the window glass plate including (i) a light-transmissive base material and (ii) a metal coating film provided on an outer peripheral part of the light-transmissive base material so as to have a certain width, the window glass plate being fixed to the housing part with use of a solder layer which is provided between the metal coating film and the housing part, and an edge part of the housing part, which edge part is located toward the window, having an overhanging part that is protruding in a direction toward a center part of the window further than an inner peripheral-side edge part of the metal coating film.

According to the configuration, in a case where the window glass plate is fixed to the housing part by melting the solder to become the solder layer between the housing part and the metal coating film of the window glass plate in production of the optical device, the solder, which has been melted, is cooled so as to shrink. In this case, the thermal expansion coefficient of the solder is greater than the thermal expansion coefficient of the light-transmissive base material of the window glass plate. A difference between the thermal expansion coefficient of the solder and the thermal expansion coefficient of the light-transmissive base material causes a tensile load (tensile stress) to be applied to the light-transmissive base material. However, the solder, which has been melted, adheres also to the overhanging part of the housing part. The overhanging part consequently restricts the shrinkage of the solder in a direction, toward a center part, along a width of the solder layer, so that the tensile load applied to the light-transmissive base material becomes reduced. This prevents the occurrence of cracking of the light-transmissive base material.

In addition, the housing part has the overhanging part. This causes a window-side end part of the solder layer, which is formed by a solder wetly spread on the metal coating film of the window glass plate, to be unlikely to protrude into the window (i.e. unlikely to jut out), and therefore prevents the solder layer from causing a reduction in an opening area of the window.

The optical device can be configured so that: the housing part is formed by a metal frame; the window glass plate is a sealing glass having a thermal expansion coefficient corresponding to a thermal expansion coefficient of the metal frame; and the solder layer has a thermal expansion coefficient greater than any of the thermal expansion coefficients of the housing part and of the window glass plate.

According to the configuration, (i) the housing part is formed by a metal frame, (ii) the window glass plate is a sealing glass having a thermal expansion coefficient corresponding to (substantially equal to) a thermal expansion coefficient of the metal frame, and (iii) the solder layer has a thermal expansion coefficient greater than any of the thermal expansion coefficients of the housing part and of the window glass plate. Therefore, in a case where the solder to become a solder layer is melted so as to fix the window glass plate to the housing part by the solder during the process of producing the optical device, the housing part is prevented from shrinking along with the solder of the solder layer when the solder is cooled. This reliably achieves, by the housing part having the overhanging part, prevention of the occurrence of cracking of the window glass plate.

The optical device can be configured so that: the housing part is made of Kovar (Registered Trademark); and the light-transmissive base material of the window glass plate is made of Kovar (Registered Trademark) glass.

According to the configuration, the housing part is made of Kovar (Registered Trademark) and the light-transmissive base material of the window glass plate is made of Kovar (Registered Trademark) glass. This reliably allows the thermal expansion coefficient of the housing part and the thermal expansion coefficient of the window glass plate to be substantially equal. This more reliably achieves, by the housing part having the overhanging part, prevention of the occurrence of cracking of the window glass plate.

The optical device can be configured so that the overhanging part measures not less than 0.2 mm and not more than 0.5 mm along a width of the metal coating film.

According to the configuration, the overhanging part of the housing part measures not less than 0.2 mm and not more than 0.5 mm along the width of the metal coating film. Therefore, while an increase in size of the optical device is prevented, it is possible to reliably form the overhanging part, and to prevent, by the overhanging part, the occurrence of cracking of the window glass plate.

That is, if the overhanging part measures less than 0.2 mm along the width of the metal coating film, then it is possible that an overhanging part is not formed due to, for example, a tolerance during assembling of the optical device by hand. Meanwhile, in a case where the overhanging part measures not less than 0.2 mm, it is possible to reliably form an overhanging part.

If the overhanging part measures more than 0.5 mm along the width of the metal coating film, then the window becomes narrow. In order to avoid such a case, it is necessary to enlarge the optical device in size. This causes an increase of the optical device in size. Therefore, by causing the overhanging part to measure not more than 0.5 mm, it is possible to prevent an increase of the optical device in size.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

INDUSTRIAL APPLICABILITY

One or more embodiments of the present invention may be used as a switch for switching an optical path of light.

REFERENCE SIGNS LIST

1 Optical device
11 Ceramic substrate
12 Optical element
13 Heater
15 Window glass plate
15a Light-transmissive base material
15b Anti-reflection film
15c Anti-reflection film
15d Metal coating film
15d1 Inner peripheral-side edge part
15d2 Outer peripheral-side edge part
16 Lid part (housing part)
16a Window
16b Outer peripheral part
16c Protruding part
16c1 Window-side edge part
16c2 Overhanging part
17 Solder layer
17a Inner peripheral-side edge part
17b Outer peripheral-side edge part
17p Solder frame
18 Resin layer

The invention claimed is:

1. An optical device comprising:
a housing part that includes an open window disposed inside the housing part;
an optical element into which light enters via the window; and
a window glass plate that blocks the window,
wherein:
the window glass plate includes a light-transmissive base material and a metal coating film provided on an outer peripheral part of the light-transmissive base material,
the window glass plate is fixed to the housing part with a solder layer provided between the metal coating film and the housing part,
the housing part includes an edge part located toward the window, and
the edge part includes an overhanging part that protrudes further than an inner peripheral-side edge part of the metal coating film in a direction toward a center part of the window.

2. The optical device as set forth in claim 1, wherein:
the housing part is formed by a metal frame;
the window glass plate is a sealing glass that includes a thermal expansion coefficient corresponding to a thermal expansion coefficient of the metal frame; and
the solder layer has a thermal expansion coefficient that is greater than any of the thermal expansion coefficients of the housing part and the window glass plate.

3. The optical device as set forth in claim 2, wherein:
the housing part is made of Kovar (Registered Trademark); and
the light-transmissive base material of the window glass plate is made of Kovar (Registered Trademark) glass.

4. The optical device as set forth in claim 1, wherein the overhanging part measures not less than 0.2 mm and not more than 0.5 mm along a width of the metal coating film.

* * * * *